UNITED STATES PATENT OFFICE.

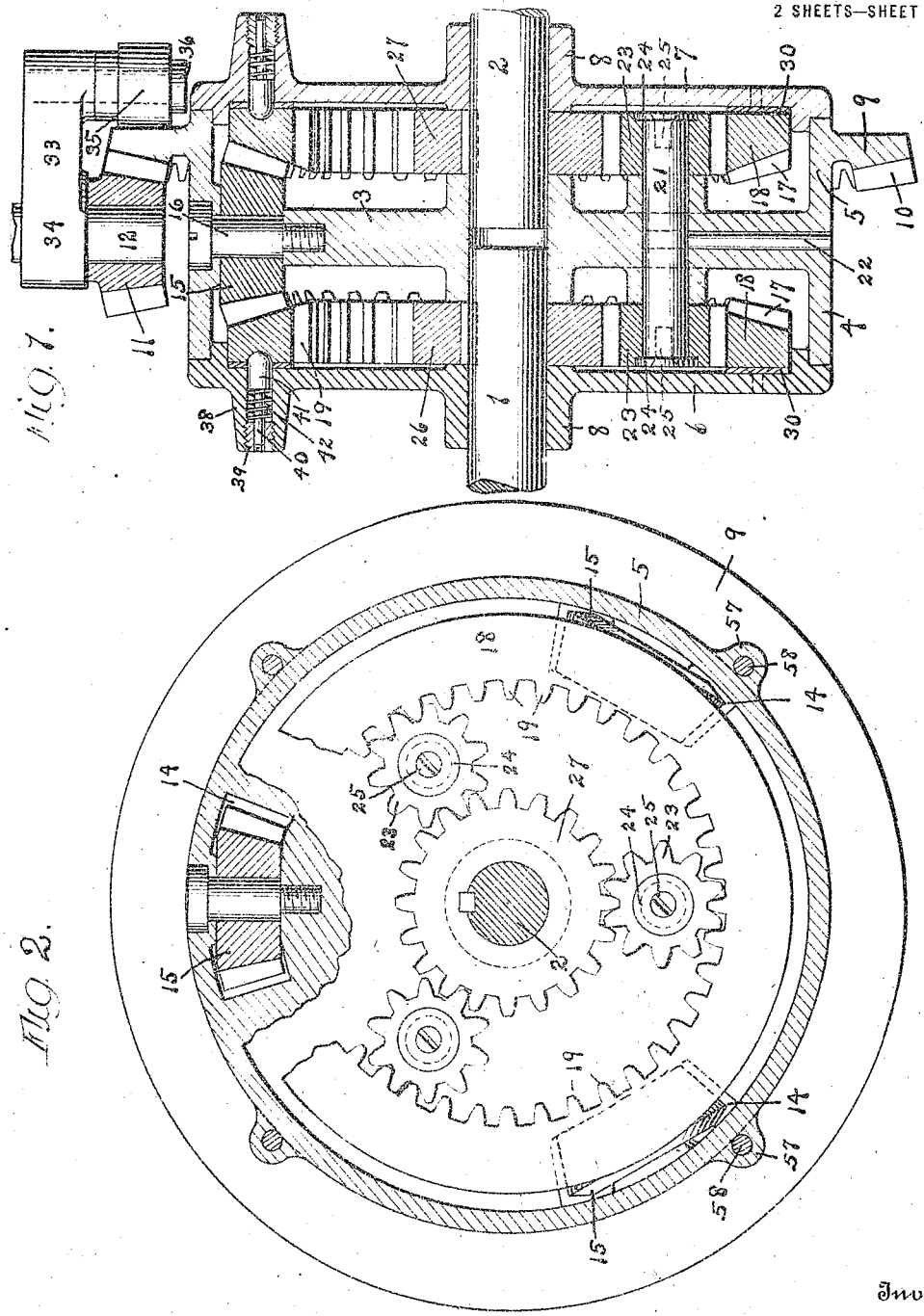

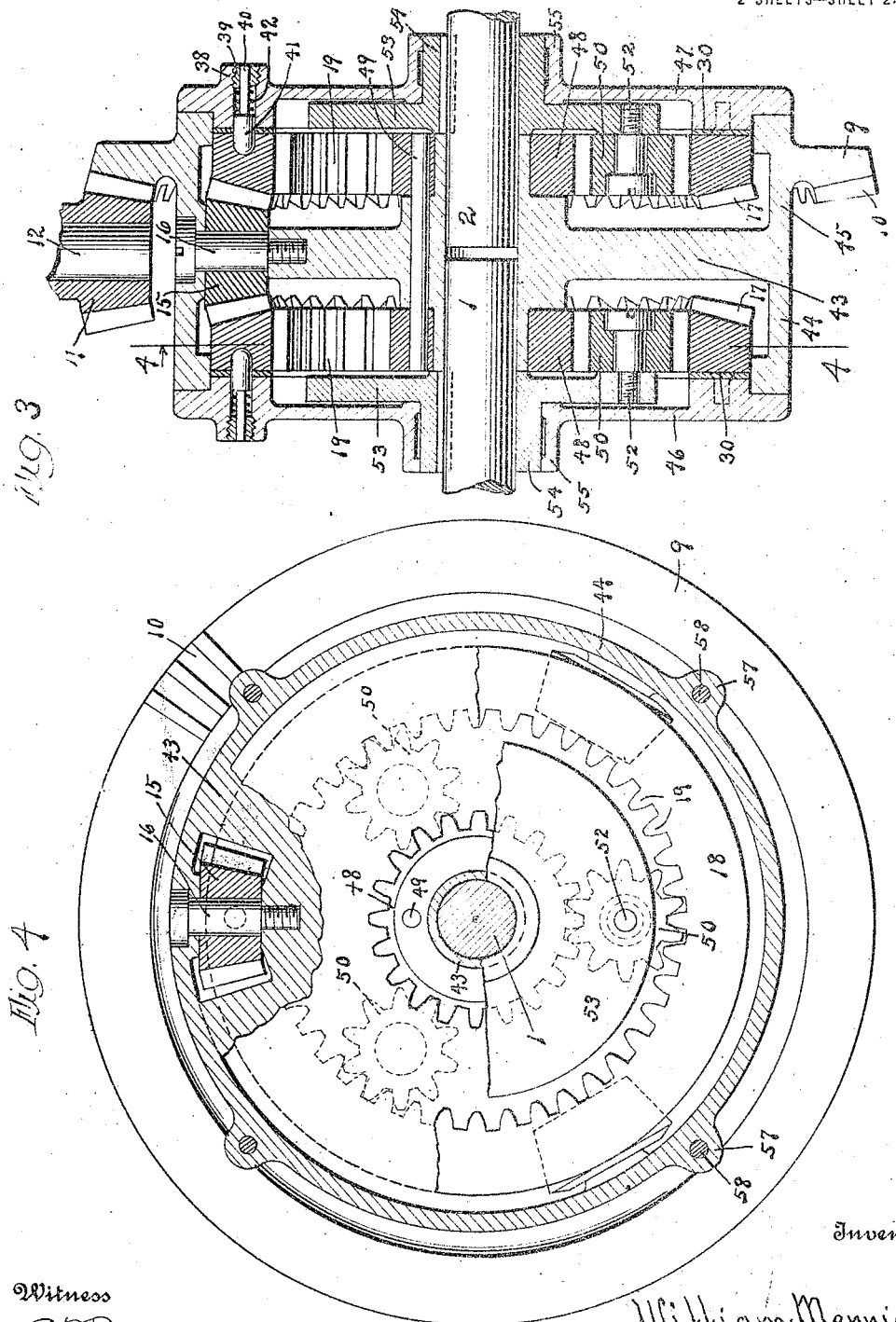

WILLIAM MENNIE, OF DETROIT, MICHIGAN, ASSIGNOR OF ONE-HALF TO CARL A. FETTIG, OF DETROIT, MICHIGAN.

DIFFERENTIAL GEAR.

1,209,007. Specification of Letters Patent. Patented Dec. 19, 1916.

Application filed August 16, 1915. Serial No. 45,636.

*To all whom it may concern:*

Be it known that I, WILLIAM MENNIE, a citizen of the Dominion of Canada, residing at Detroit, in the county of Wayne and State of Michigan, have invented a new and useful Differential Gear, of which the following is a specification.

This invention relates to driving mechanism for the rear axles of motor vehicles, and its object is to provide a device which will freely permit relative rotation between two sections of a driven axle or shaft when one tends to exceed the speed of the other, but which will restrain such relative movement when one tends to lag behind the other and both are loaded.

This invention consists, in combination with a casing into which the alined sections of a divided driven shaft extend and in which they are revoluble independent of each other, of a differential bevel gear revolubly mounted in the casing with its axis radially of the divided shaft, a pair of opposed gear rings co-axially mounted in the casing, one on each side of the bevel gear and each having lateral teeth to mesh with the bevel gear and also provided with internal teeth, and a gearing structure for operatively connecting each ring with the adjacent section of the divided shaft.

In the accompanying drawings, Figure 1 is a central vertical section of one embodiment of this present invention. Fig. 2 is an elevation of this structure with the end of the casing broken away and also with a portion of the web of the casing broken away to show a bevel gear. Fig. 3 is a view similar to Fig. 1 of a modified form of this device. Fig. 4 is a section on the line 4—4 of Fig. 3.

Similar reference characters refer to like parts throughout the several views.

Referring first to Figs. 1 and 2, the differential gear construction there illustrated is mounted on the sections 1 and 2 of a divided shaft. The casing consists of a web 3, cylindrical flanges 4 and 5, and ends 6 and 7 having hubs 8 which ends are connected to the flanges 4 and 5 in any desired manner. A radial flange 9 may be formed on the flange 5 and provided with teeth 10 to engage the pinion 11 on the shaft 12, or any other means may be employed to revolve the casing.

Pockets 14 are formed at preferably regular intervals in the web, and differential pinions 15 are mounted in these pockets on the radial pins or bolts 16. These are engaged by the lateral teeth 17 of the opposed gear rings 18, which also have internal teeth 19.

Shafts 21 are mounted at regular intervals in the web 3, and secured therein, in any desired manner, locking pins 22 being shown. On these shafts, and meshing with the internal teeth 19, are the idlers 23, being held from endwise movement, if desired, by the washers 24 and screws 25. These idlers in turn mesh with the pinions 26 and 27 secured to the sections 1 and 2, respectively, of the divided shaft. The pinion 11 will revolve the casing and the web 3, carrying around the shafts 21 and the idlers 23. With a load on the sections 1 and 2, this would cause the idlers to revolve and with them, the rings 18. But as these mesh with the differential pinions 15, both rings cannot rotate in the same direction, the rings 18 will therefore remain at rest and the sections 1 and 2 be driven by means of the shafts 21.

When a greater load is placed on one of the shaft sections than on the other, the tendency of one of the rings to revolve is greater than that of the other and if there were no friction, the pinions 15 would freely turn and permit the section with the greater load to remain at rest. But because of the wedging action of substantially all gear teeth, any stresses between the gear rings 18 and pinions 15 causes these rings to be forced apart against the end plates 6 and 7. The result is that considerably more than one half of the turning stress is exerted on the section having the greater load, even when the other section has but very little load. This proportion of stress on the loaded section can be increased by securing friction rings 30 to the inner faces of the ends 6 and 7. When one of the sections of the driven shaft runs freely and unloaded, or attempts to run faster than the other, as when the device is mounted on the rear axle of an automobile and the vehicle is turning a corner, the friction between the gear rings 18 and the friction rings 30 is substantially negligible.

To hold the teeth of the pinion 11 and of the ring 9 in perfect mesh, an arm 33 may be formed on the bearing 34 of the shaft 12, and a roller 35 on the pin 36 carried by this arm may bear against the back of the ring 9 to prevent outward movement thereof. In case the teeth of the pinions 15 should strip, the rings 18 would revolve freely and the sections 1 and 2 would remain stationary. To permit these sections to be driven under these circumstances, bosses 38 may be formed on the ends 6 and 7 and be provided with screw plugs 39 in which the stems 40 are slidable. The heads 41 on these stems may be forced into proper notches in the rings 18 by the springs 42 and thus lock the parts together. These stems are not positioned until after the accident occurs.

One of the principal advantages of this construction, and of the construction shown in Figs. 3 and 4, is that there are no endwise stresses on the sections 1 and 2 of the shaft. All the endwise stresses are taken care of by the casing and by the friction rings 30.

In the constructions shown in Figs. 3 and 4, the web 43 has flanges 44 and 45 to which the ends 46 and 47 are secured. The pins or bolts 16, pinions 15 thereon, gear rings 18 having teeth 17 and 19, flange 9 formed on the casing and having teeth 10 engaged by the pinion 11 on the shaft 12, the friction rings 30 placed back of the gear rings, the hubs 38, the plugs 39, the stems 40 having heads 41 and the springs 42 may be the same as before described.

Mounted on the web 43 in any desired manner, are the gears 48, a pin 49 being shown to hold them in position. Idlers 50 mesh with these gears and with the internal teeth of the gear rings 18. These idlers are mounted on pins 52 carried by the disks 53, and these disks have hubs 54 that are secured to the sections 1 and 2. If desired, the ends 46 and 47 may have hubs 55 that are journaled on the hubs 54. In both forms of casing, the ends and cylindrical flanges may be provided with ears 57 through which short bolts 58 extend to secure the parts together.

I claim:

1. In a differential gear, the combination with the adjacent ends of a divided shaft, of a case consisting of a circular central web, cylindrical flanges extending in both directions from the periphery of said web, and end plates secured to said flanges, a bevel gear mounted in a pocket in said web with its axis radial to said shaft, a pair of gear rings within the casing, one on each side of the web, co-axial with said shaft and having lateral teeth meshing with the teeth of said bevel pinion and also having internal teeth, a spur gear secured to each section of the divided shaft, an idler pinion meshing with each spur gear and the internal teeth of the adjacent gear ring, supporting means for the idler pinions mounted on the web of the case, and means to revolve the case.

2. In a differential gear, the combination with the adjacent ends of a divided shaft, a case mounted thereon, a revoluble bevel gear mounted in said case with its axis radial to said shaft, a pair of parallel gear rings within the casing, one on each side of the bevel gear and meshing therewith, said rings having internal teeth, idler pinions meshing with said internal teeth, supports for said pinions rigidly mounted in the case, and a spur gear on the adjacent end of each section of the divided shaft, with which said idler pinions engage.

3. In the differential gear, the combination with the adjacent ends of a divided shaft, a casing mounted thereon, a revoluble bevel gear mounted in said casing with its axis radial to said shaft, a pair of co-axial gear rings within said casing, one on each side of the bevel gear and meshing therewith, said rings having internal teeth, an idler pinion meshing with said internal teeth of each gear ring, means to support said pinions, a spur gear mounted concentric with the ends of each section of the divided shaft and meshing with the adjacent idler pinion, and means to revolve the casing.

4. In a differential gear, the combination with the adjacent ends of a divided shaft, a casing mounted thereon, means to revolve the casing, a revoluble bevel gear mounted in said casing with its axis radial to said shaft, a pair of co-axial gear rings mounted within the casing, one on each side of the bevel gear and meshing therewith, a friction ring mounted within the casing in alinement with each gear ring and against which said gear ring may be pressed by the bevel gear when the casing is revolved under stress, said rings also being provided with internal teeth, a spur gear on the adjacent end of each shaft in the same plane with one of the gear rings, an idler pinion meshing with each gear ring and the spur gear in the same plane therewith, and means mounted on the case to revolubly support the idler.

5. In a differential gear, the combination with the adjacent ends of a divided shaft, a casing mounted thereon, means to revolve the casing, a revoluble bevel gear mounted in said casing with its axis radial to said shaft, a pair of co-axial gear rings mounted within the casing, one on each side of the bevel gear and meshing therewith, a friction ring mounted within the casing in alinement with each gear ring and against which said gear ring may be pressed by the bevel gear when the casing is revolved under stress, said rings also being provided with internal teeth, a spur gear mounted concentrically with the adjacent end of each section of the divided shaft in the same plane with one of the gear rings, an idler pinion meshing with each gear ring and the spur gear in the same plane therewith, means to support the idler pinions, and means for operatively connecting the spur gears, idler pinions and shaft sections.

6. In a differential gear, the combination with the adjacent ends of a divided shaft, a casing mounted thereon, means to revolve the casing, a revoluble bevel gear mounted in said casing with its axis radial to said shaft, a pair of co-axial gear rings mounted within the casing, one on each side of the bevel gear and meshing therewith, said rings also being provided with internal teeth, a spur gear mounted concentrically with the adjacent end of each section of the divided shaft in the same plane with one of the gear rings, an idler pinion meshing with each gear ring and the spur gear in the same plane therewith, means to support the idler pinions, and means for operatively connecting the spur gears, idler pinions and shaft sections.

7. In a differential gear, the combination with the adjacent alined ends of a divided shaft, a driving member revoluble relative to said shafts and pins carried thereby parallel to said shafts, revoluble pinions on said pins, a gear secured to the end of one of said shafts and meshing with said pinions, an interior gear mounted concentric with said shafts and meshing with the pinions on said pins that mesh with the gear on said shaft, and means to operatively connect said internal gear to the other shaft.

In testimony whereof I sign this specification.

WILLIAM MENNIE.